UNITED STATES PATENT OFFICE 2,199,887

METHOD OF PREPARING GRAINED CONFECTIONS

Albert A. Lund, New York, N. Y.

No Drawing. Application September 27, 1934, Serial No. 745,833. Renewed April 6, 1939

6 Claims. (Cl. 99—134)

This invention relates to improvements in grained confections and, more particularly, to confectionery material grained in the dextrose phase, and includes methods of preparing the same.

Dextrose phase confections, such as dextrose fondants, prepared by heretofore known processes, have been characterized by many faults. Fondants produced by the two most widely known methods, both of which are represented in the patent art, are characterized on the one hand by a coarse, sandy texture and, on the other hand, by a lardy texture, grayish in color.

The products of the present invention avoid the above and other undesirable qualities, and are smooth, soft and plastic, but form-retaining. Further desirable characteristics not heretofore attained include remarkable improvement in keeping quality, whiteness of color and a non-cloying sweetness of taste.

The present invention deals with a single batch process wherein all the ingredients of the final product may be combined at one time, as distinguished from the type of process in which two or more batches are separately treated before being combined. The process is therefore simple and as will appear, avoids excessive time demands on the equipment utilized.

In the practice of the process of this invention, hydrate or anhydrous dextrose and other sugars, such as sucrose, are mixed with enough water to dissolve the same and subjected to at least a boiling temperature to provide a water solution. The solution is then cooled to facilitate crystallization, seed or starting crystals are added and the mass is subjected to vigorous agitation sufficient to generously distribute throughout the mass a large number of crystal nuclei. This condition will arise while the mass is still fluid and before the mass reaches a pasty consistency. The agitation may be effected in a power beater of the nougat or dough type in order that a vigorous agitation will be ensured and is preferably performed at a temperature somewhat lower than in the usual dextrose creaming steps, preferably between 60° and 75° F., which conforms to the normal cooling practice with sucrose fondants. From five to fifteen minutes at the most is usually sufficient time for vigorous agitation to effect the desired distribution of crystal nuclei. The mass, while still of fluid consistency, may then be poured from the beater into trucks, where crystallization is finished spontaneously, or it may be deposited directly into molds or containers for final use. If desired, a frappe, color, flavor, in any combination, may be added to the solution prior to the agitating step.

Were creaming completed in the beater in the usual manner, not only would an excessive time demand be made upon the machine to produce the required finished consistency, but a precipitate of exceedingly fine crystals results. Such very fine crystallization produces a gray translucent color and gives a lardy or cold cream-like consistency which is characteristic of the objection to the products of prior processes of this type. This microscopic crystallization presents an adsorptive interface of such magnitude that, once predisposed to it, the adsorption of the syrup phase by the crystals ultimately causes the cream to solidify into a cement-like mass. On the other hand, where the creaming is entirely spontaneous, an insufficient number of seed nuclei are available for a microscopic crystallization and the tendency is for these to take on additional crystal deposit and form relatively large and coarse crystals or crystal aggregates. Products prepared in this manner have an undesirable coarse, sandy texture.

In the crystallizing operation of the present invention, the multiplicity of crystal nuclei, on subsequent spontaneous crystallization, develops a large number of crystals of a size intermediate as compared with the crystal size heretofore developed in fondants manufactured by prior processes. The resultant cream is not lardy on the one hand, nor coarse and granular on the other, but is exceedingly smooth and is without tendency to stick to the mouth. The whiteness of the cream is also improved due to the increased light reflection of the larger crystals.

The following specific example, illustrative of the practice of the present invention, is not to be regarded in a limiting sense, but merely as exemplary: 300 parts dextrose and 100 parts sucrose, combined with sufficient water to dissolve, are boiled to 224° F. to 230° F. The solution is then cooled to 60° F. to 75° F. Seed is added, such as 10 parts of fondant from a preceding batch, and the mass is thence subjected to vigorous agitation in a power beater for about five to fifteen minutes only, while the relatively low temperature range of from 60° F. to 75° F. is maintained. The product, at the conclusion of this step, is a free flowing fluid containing a multiplicity of starter crystals or crystal nuclei for the subsequent step of spontaneous crystallization. The mass may be poured into molds or other containers and crystallization is allowed to run to completion spontaneously. A semi-solid or fondant consistency is attained in several hours or overnight, according to the duration of the agitating step. Color and flavor may be added, as in the usual sucrose "remelt" and "bob" processes, or, if desired, 25 to 50 parts of colloid stabilizer or frappe, as well as color and flavor may be added to the mass prior to the agitating step.

Using the proportions under the conditions above specified, the sucrose content of the batch is such that all of it will remain in the syrup phase under the conditions imposed without crystallizing out. It is sufficient in volume to ensure a non-crystallizing menstruum sufficient to satisfy the adsorption requirements of the crystal phase and to provide the necessary surplus of mobile syrup to render the product soft and plastic. The proportion of sucrose given in the example (25% of the total sugars) results in a syrup phase containing approximately two parts dextrose to one part sucrose and provides a cream of maximum keeping quality.

The water content of the product of this invention is about 25 to 30% as compared with 20 to 25% in the ordinary dextrose fondant and 10 to 15% in the ordinary sucrose fondant. Nevertheless, the product is no more susceptible to fermentation than the usual run of sucrose phase creams, owing to the proportionately higher preserving power of the combination of sugars present in the syrup phase. Although the density of the syrup is only about 65%, since the proportion of dextrose and sucrose is approximately two to one, the resulting osmotic pressure and preserving power of this syrup is equivalent to the preserving power of the proportions of sucrose and invert sugar found in a sucrose fondant syrup having a density of about 75%.

Important factors which maintain the continued softness and general desirability of the herein described product are the critical intermediate size of the crystals and the proportions of dextrose and non-dextrose in the syrup phase, the excess of non-dextrose sugar being sufficient to prevent continued crystallization and syrup adsorption. The size of the crystal governs the extent of crystal surface area and the volume of the adsorbed syrup film. Whereas excessively small crystals, as resulting from completed crystallization under agitation, will absorb all the available syrup, crystals of intermediate size provide a proportionately diminished surface area and the resulting surplus of unadsorbed syrup provides a menstruum for the crystals, giving a desirable softness and plasticity to the product which contrasts with the coarse, sandy texture of products composed of excessively large crystals or crystal aggregates, such as result from spontaneous crystallization alone.

Having thus described my invention, I claim:

1. The method of preparing a grained confection which comprises preparing a solution of dextrose and sucrose, the latter being in sufficient quantity to supply an excess of syrup in the finished product, cooling and adding seed to the solution, subjecting the mixture to vigorous agitation whereby a distribution of crystal nuclei throughout the mass is effected, but whereby the fluid consistency of the mass is not destroyed, and thereafter permitting crystallization to continue spontaneously.

2. In the preparation of confectionery material, grained in the dextrose phase, that improvement which comprises subjecting a cooled, seeded solution of dextrose and sucrose to vigorous agitation sufficient to secure a distribution of crystal nuclei throughout the mass, but maintaining the mass in a fluid condition, and thence permitting crystallization to proceed spontaneously.

3. The method of preparing a grained confection which comprises, providing a mixture of water and approximately three parts dextrose and one part sucrose, boiling the mixture at a temperature from 224° F. to below 230° F. to provide a water solution, cooling the solution to between 60° F. and 75° F., agitating the cooled mass to effect a distribution of crystal nuclei and thence permitting crystallization to proceed spontaneously.

4. The method of preparing a grained confection which comprises, boiling a mixture containing water, dextrose and sucrose at a temperature from 224° F. to below 230° F. to provide a water solution, cooling the solution, adding seed and effecting crystallization by agitation and spontaneity.

5. The method of preparing a grained confection which comprises preparing a solution of dextrose and a sugar other than dextrose, the latter being in sufficient quantity to supply an excess of syrup in the finished product, cooling and adding seed to the solution, subjecting the mixture to vigorous agitation whereby a distribution of crystal nuclei throughout the mass is effected but whereby the fluid consistency of the mass is not destroyed, and thereafter permitting crystallization to continue spontaneously.

6. In the preparation of confectionery material, grained in the dextrose phase, that improvement which comprises subjecting a cooled, seeded solution of dextrose and a sugar other than dextrose to vigorous agitation sufficient to secure a distribution of crystal nuclei throughout the mass, but maintaining the mass in a fluid condition, and thence permitting crystallization to proceed spontaneously.

ALBERT A. LUND.